(12) United States Patent
Yoo et al.

(10) Patent No.: US 9,088,382 B2
(45) Date of Patent: Jul. 21, 2015

(54) OPTICAL LINE TERMINAL OF PASSIVE OPTICAL NETWORK, AND METHOD FOR CONTROLLING UPSTREAM BAND USING THE SAME

(71) Applicant: Electronics and Telecommunications Research Institute, Daejeon (KR)

(72) Inventors: Hark Yoo, Gwangju (KR); Youngsuk Lee, Gwangju (KR); Geun Yong Kim, Gwangju (KR); Sung Chang Kim, Gwangju (KR); Dongsoo Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 138 days.

(21) Appl. No.: 13/872,612

(22) Filed: Apr. 29, 2013

(65) Prior Publication Data

US 2014/0270768 A1    Sep. 18, 2014

(30) Foreign Application Priority Data

Mar. 18, 2013  (KR) ........................ 10-2013-0028469

(51) Int. Cl.
| | |
|---|---|
| H04B 10/20 | (2006.01) |
| H04L 12/911 | (2013.01) |
| H04J 14/02 | (2006.01) |
| H04Q 11/00 | (2006.01) |
| H04J 14/08 | (2006.01) |
| H04Q 3/00 | (2006.01) |

(52) U.S. Cl.
CPC ............ *H04J 14/0227* (2013.01); *H04J 14/08* (2013.01); *H04Q 11/0067* (2013.01); *H04Q 3/0066* (2013.01); *H04Q 2213/13332* (2013.01)

(58) Field of Classification Search
None
See application file for complete search history.

(56) References Cited

U.S. PATENT DOCUMENTS 6,931,013 B2 *  8/2005  Saikusa ...................... 370/395.4
7,818,389 B1 * 10/2010  Chiang et al. ................. 709/212

(Continued)

FOREIGN PATENT DOCUMENTS

KR          10-0950337          3/2010

OTHER PUBLICATIONS

ITU-T G.987.3: "10-Gigabit-capable passive optical networks (XG-PON): Transmission convergence (TC) layer specification", Oct. 2010, pp. 1-134.*

*Primary Examiner* — Li Liu
(74) *Attorney, Agent, or Firm* — Nelson Mullins Riley & Scarborough LLP; Anthony A. Laurentano, Esq.; Lewis Lee, Esq.

(57) ABSTRACT

Disclosed are an apparatus and a method capable of adjusting an upstream band for a corresponding ONU by detecting a quantity of bands occupied by a packet, not an effective user packet, among upstream transmission bands for each target object of allocation of each band in the OLT to examine whether a queue report is normal, and detecting an ONU, which transmits an abnormal queue report, according to the examination. An OLT of a PON according to an exemplary embodiment of the present disclosure includes: a frame monitoring unit configured to monitor upstream frame data received for each T-CONT; an error detection unit configured to determine whether a queue report error is generated for each T-CONT according to a result of the monitoring; and a band allocation controller configured to allocate an upstream band for an ONU, in which the queue report error is generated, separately from a normal ONU.

9 Claims, 3 Drawing Sheets

(56) References Cited

U.S. PATENT DOCUMENTS

| | | | |
|---|---|---|---|
| 8,374,194 B2* | 2/2013 | Tanaka et al. | 370/458 |
| 8,442,398 B2* | 5/2013 | Li et al. | 398/16 |
| 8,634,431 B1* | 1/2014 | Chiang et al. | 370/412 |
| 8,824,504 B2* | 9/2014 | Zou | 370/474 |
| 2005/0158048 A1* | 7/2005 | Sung et al. | 398/66 |
| 2007/0269212 A1* | 11/2007 | Remein et al. | 398/63 |
| 2009/0104878 A1* | 4/2009 | Fujimura | 455/67.11 |
| 2010/0008379 A1* | 1/2010 | Yoo et al. | 370/468 |
| 2010/0221006 A1* | 9/2010 | Yoon et al. | 398/58 |
| 2011/0091211 A1* | 4/2011 | Kazawa et al. | 398/63 |
| 2011/0129223 A1* | 6/2011 | Yoo et al. | 398/58 |
| 2011/0150463 A1* | 6/2011 | Zhou et al. | 398/25 |
| 2011/0305458 A1* | 12/2011 | Zhou et al. | 398/66 |
| 2012/0148247 A1* | 6/2012 | Skubic et al. | 398/58 |
| 2012/0149418 A1* | 6/2012 | Skubic et al. | 455/509 |
| 2012/0163808 A1* | 6/2012 | Kim et al. | 398/30 |
| 2013/0045010 A1* | 2/2013 | Mukai | 398/52 |
| 2013/0156420 A1* | 6/2013 | Amitai et al. | 398/27 |
| 2013/0156426 A1* | 6/2013 | Kim et al. | 398/45 |
| 2013/0315596 A1* | 11/2013 | Rollet | 398/67 |
| 2014/0079396 A1* | 3/2014 | Hirano et al. | 398/67 |

* cited by examiner

US 9,088,382 B2

OPTICAL LINE TERMINAL OF PASSIVE OPTICAL NETWORK, AND METHOD FOR CONTROLLING UPSTREAM BAND USING THE SAME

CROSS-REFERENCE TO RELATED APPLICATIONS

This application is based on and claims priority from Korean Patent Application No. 10-2013-0028469, filed on Mar. 18, 2013, with the Korean Intellectual Property Office, the disclosure of which is incorporated herein in its entirety by reference.

TECHNICAL FIELD

The present disclosure relates to a technology for preventing an upstream band from being unnecessarily occupied due to a queue report error of a specific optical network unit (ONU) in a passive optical network (PON) system.

BACKGROUND

An optical network is a technology for effectively providing a necessary band to a network unit, and has a point-to-point structure and a point-to-multipoint structure. An optical line terminal (OLT) has an interface for supporting a plurality of optical network units (ONU), and has a control authority for the entire ONUs. In general, the point-to-point structure is mainly used in an active optical network (AON), and the point-to-multipoint structure is mainly used in a passive optical network, and the point-to-point structure and the point-to-multipoint structure are standardized by an international standardization organization, such as IEEE and ITU-T.

FIG. 1 is a configuration diagram of a general PON system.

As illustrated in FIG. 1, the PON system generally has a tree structure in which one OLT 101 corresponds to a plurality of ONUs 105 to 107 as a ratio of 1:N through a passive element 103. In downstream transmission to the ONUs 105 to 107 in the OLT 101, data transmitted by the OLT 101 is broadcasted to the entire ONUs 105 to 107, so that a problem due to media sharing is not generated. However, in a case of upstream transmission, the plurality of ONUs 105 to 107 is connected to the OLT 101 through one optical fiber from the passive element 103, so that a time division multiple access medium access control (TDMA MAC) protocol using a transmission media while avoiding temporal overlap is necessary in order to perform the upstream transmission without a collision between the ONUs 105 to 107.

In the meantime, according to the XGPON standard established by the ITU-T, in order to embrace traffic having various characteristics, each ONU stores and transmits upstream data according to a priority by setting a separate class queue called T-CONT (transmission container) for each service class. The OLT may effectively use a band by collecting standby state information regarding the number of standby user packets in a corresponding queue from the ONT for the T-CONTs operated in the entire PON links managed by the OLT, and allocating an upstream band width for each T-CONT based on the collected standby state information.

As described above through the ITU-T XGPON standard, the upstream transmission the passive optical network (PON), especially, the PON based on the TDMA, is performed in a method in which the ONU first makes a report of a quantity of user packets stacked in the ONU queue to the OLT, the OLT determines upstream bands for the entire ONUs based on the report and allocates the determined upstream band to each ONU, and thus the ONU transmits data within the allocated band in response to the allocation.

When the specific ONU reports that a quantity of user packets is larger than the quantity of user packets standing by in the actual queue, or reports that the queue always seems to be fully filled regardless of the quantity of actual user packets in this structure, the OLT determines the upstream band of each ONU and allocates the determined upstream band while depending on the corresponding report, thereby resulting in unnecessary waste of the upstream band width.

When the ONU making a queue report error is present in the network as described above, a part of or an entire upstream bandwidth is unnecessarily occupied, and as a result upstream transmission of another normal ONU is disturbed. This causes a similar result to a rogue ONU in which an optical module of the specific ONU disturbs the upstream transmission of other ONUs by creating an abnormal operation. Accordingly, a method and an apparatus for detecting the queue report error of the ONU to take measures for the ONU, which transmits an incorrect queue report, are necessary.

SUMMARY

The present disclosure has been made in an effort to provide an apparatus and a method capable of adjusting an upstream band for a corresponding ONU by detecting a quantity of bands occupied by a packet, not an effective user packet, among upstream transmission bands for each target object of allocation of each band in the OLT to examine whether a queue report is normal, and detecting an ONU, which transmits an abnormal queue report, according to the examination.

An exemplary embodiment of the present disclosure provides an optical line terminal (OLT) of a passive optical network (PON) including: a frame monitoring unit configured to monitor upstream frame data received for each transmission container (T-CONT); an error detection unit configured to determine whether a queue report error is generated for each T-CONT according to a result of the monitoring; and a band allocation controller configured to allocate an upstream band for an optical network unit (ONU), in which the queue report error is generated, separately from a normal ONU.

The frame monitoring unit may determine whether a frame is an idle frame by using header information of the received upstream frame data, and calculate an entire size of the upstream frame data for each T-CONT and a size of the idle frame.

When the size of the idle frame to the entire size of the upstream frame data according to a result of the calculation is larger than a predetermined threshold, the error detection unit may determine that the queue report error is generated.

The band allocation controller may include: a normal ONU band allocation unit; an abnormal ONU band allocation unit; a multiplexer configured to multiplex band allocation information generated in the normal ONU band allocation unit and the abnormal ONU band allocation unit; and a processor configured to control so that the abnormal ONU band allocation unit processes the band allocation for the ONU, in which the queue report error is generated, by using information received from the error detection unit.

The processor may recognize an ONU, in which the queue report error is generated, by using the identification information (AllocID) of the T-CONT.

The abnormal ONU band allocation unit may decrease an upstream band of a corresponding ONU for every predetermined level according to the number of times of generating the queue report error.

Another exemplary embodiment of the present disclosure provides a method of controlling an upstream band by using an optical line terminal (OLT) of a passive optical network (PON), including: monitoring upstream frame data received for each transmission container (T-CONT); determining whether a queue report error is generated for each T-CONT according to a result of the monitoring; and allocating an upstream band for an optical network unit (ONU), in which the queue report error is generated, separately from a normal ONU.

The monitoring of the upstream frame data may include: determining whether a frame is an idle frame by using header information of the received upstream frame data; and calculating an entire size of the upstream frame data and a size of the idle frame for each T-CONT.

The determining whether the queue report error is generated may include determining that the queue report error is generated when the size of the idle frame to the entire size of the upstream frame data according to a result of the calculation is larger than a predetermined threshold.

The allocating of the upstream band may include: recognizing an ONU, in which the queue report error is generated, by using the identification information (AllocID) of the T-CONT; and controlling so that an abnormal ONU band allocation unit separately processes band allocation for the ONU in which the queue report error is generated.

According to the exemplary embodiments of the present disclosure, it is possible to detect a quantity of bands occupied by a packet (that is, an idle frame in a case of an ITU-T XGPON), not an effective user packet, among upstream transmission bands for each target object of allocation of each band (that is, a T-CONT in a case of the ITU-T XGPON) in the OLT to examine whether a queue report is normal, and detect an ONU, which transmits an abnormal queue report, according to the examination. Accordingly, it is possible to adjust an upstream band for the ONU, in which the queue report error is generated, and it is possible to solve a situation in which an upstream band is unnecessarily wasted by the corresponding ONU or upstream data transmission of another normal ONU is disturbed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The aforementioned objects, characteristics, and advantages will be described with reference to the accompanying drawings in detail, and thus those skilled in the art to which the present disclosure pertains will easily implement the technical spirit of the present disclosure. In the following description, a detailed explanation of known related functions and constitutions may be omitted so as to avoid unnecessarily obscuring the subject manner of the present disclosure. Hereinafter, an exemplary embodiment according to the present disclosure will be described with reference to the accompanying drawings in detail.

Figure 1:
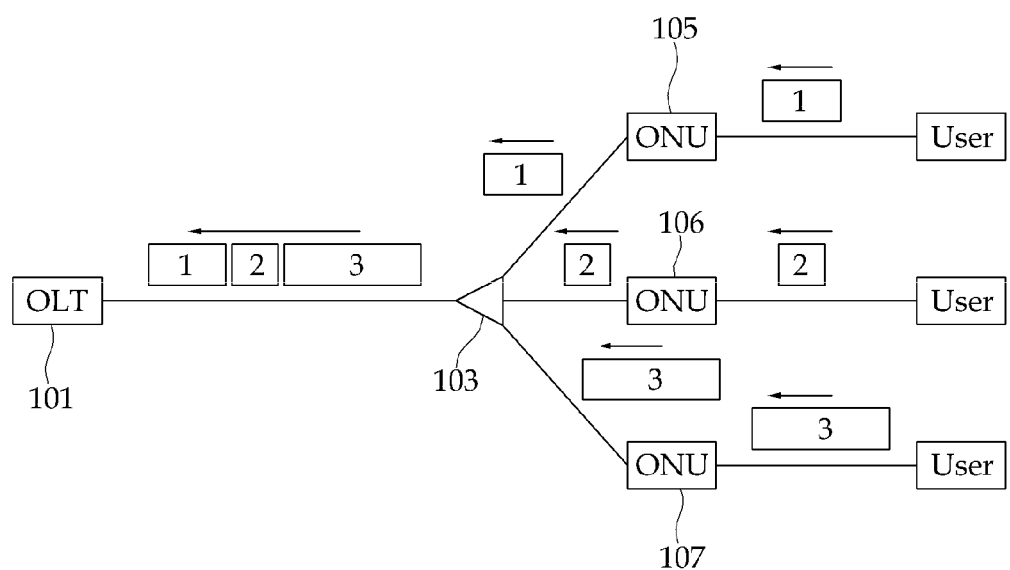
FIG. 1 is a configuration diagram of a general PON system.
Figure 2:
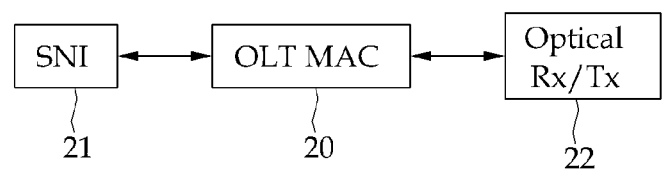
FIG. 2 is a schematic configuration diagram of an optical line terminal (OLT) of a passive optical network (XG-PON1) according to an exemplary embodiment of the present disclosure.
Figure 3:
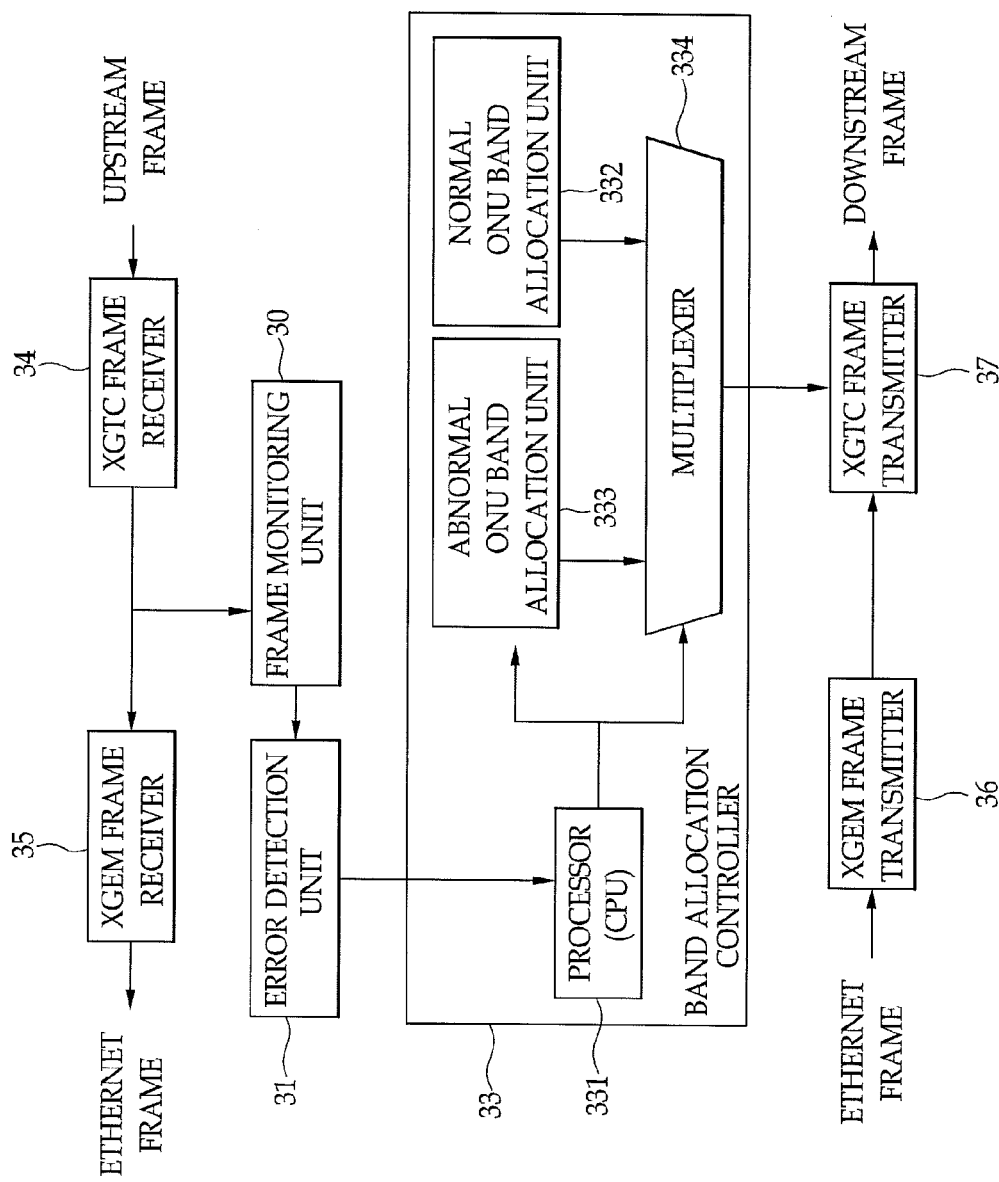
FIG. 3 is a detailed configuration diagram of an OLT MAC of FIG. 2.

FIG. 2 is a schematic configuration diagram of an optical line terminal (OLT) of a passive optical network (XG-PON1) according to an exemplary embodiment of the present disclosure, and FIG. 3 is a detailed configuration diagram of an OLT MAC of FIG. 2.

Referring to FIGS. 2 and 3, an XG-PON1 OLT according to the exemplary embodiment of the present disclosure includes an OLT MAC 20 for detecting an ONU, which transmits an abnormal queue report, by monitoring a frame for each T-CONT to separately adjust an upstream band of the corresponding ONU, a service network interface (SNI) 202 that is an uplink interface, and an optical Tx/Rx 22 for transmitting/receiving an optical signal to/from a PON section.

The OLT MAC 20 includes a frame monitoring unit 30 for monitoring upstream frame data received for each T-CONT, an error detection unit 31 for determining whether a queue report error for each T-CONT is generated according to a result of the monitoring, and a band allocation controller 33 for allocating an upstream band for an ONU, in which the queue report error is generated, separately from a normal ONU. The OLT MAC 20 may further include an XGTC frame receiver 34 as a configuration for transceiving upstream data and downstream data between the SNI 21 and the optical Rx/Tx 22, an XGEM frame receiver 35, an XGEM frame transmitter 36, and an XGTC frame transmitter 37.

The frame monitoring unit 30 may receive a copy of upstream XGEM frame data and AllocID information, which is identification information of the T-CONT, among outputs transmitted from the XGTC frame receiver 34 and the XGEM frame receiver 35. The frame monitoring unit 30 may determine whether a frame is an idle frame by using header information of the input XGEM frame data, add each of the entire size (the number of bytes) of the upstream frame data for each AllocID and a size of the idle frame (the number of bytes) by counting a length of each frame, and transmit the addition to the error detection unit 31.

The error detection unit 31 may calculate a ratio of the size of the idle frame to the entire size of the received upstream data frame for each AllocID, and determine that the queue report error is generated when the calculated ratio is larger than a predetermined threshold. When the queue report error is generated as described above, the error detection unit 31 may transmit error generation information to the band allocation controller 33 in an alarm form.

The band allocation controller 33 may include a normal ONU band allocation unit 332, an abnormal ONU band allocation unit 333, a multiplexer 334 for multiplexing band allocation information generated in the normal ONU band allocation unit 332 and the abnormal ONU band allocation unit 333, and a processor 331 for controlling so that the abnormal ONU band allocation unit 333 processes the band allocation for the ONU, in which the queue report error is generated, by using the information received from the error detection unit 31.

The processor 331 recognizes the ONU, in which the queue report error is generated, through the AllocID of the T-CONT in which the alarm is generated, and controls so that the abnormal ONU band allocation unit 333, not the existing normal ONU band allocation unit 332, processes the band allocation for the corresponding ONU.

The multiplexer 334 multiplexes the band allocation information generated in the normal ONU band allocation unit 332 and the abnormal ONU band allocation unit 333 and transmits the multiplexed band allocation information to the XGTC frame transmitter 37.

Through the aforementioned method, it is possible to control so that the band allocation for the ONU, in which the queue report error is generated, is separately performed from the band allocation for the normal ONU. A method according to pre-setting by a user may be selected as an algorithm used in this case, or various methods, including a decrease in band allocation for every predetermined level (for example, ½) according to the number of times of the queue report errors may be used for the algorithm.

Figure 4:
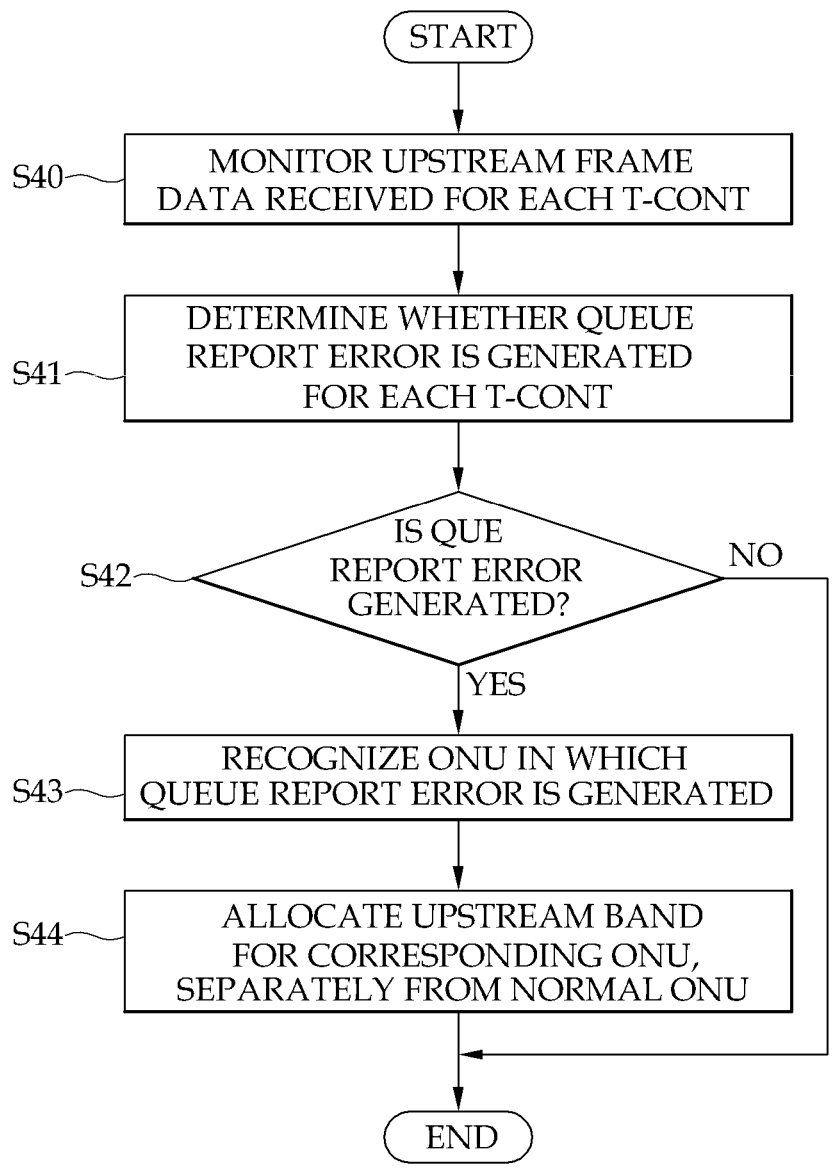
FIG. 4 is a flowchart illustrating a method of controlling an upstream band using the optical line terminal (OLT) of the passive optical network (XG-PON1) according to the exemplary embodiment of the present disclosure.

FIG. 4 is a flowchart illustrating a method of controlling an upstream band using the optical line terminal (OLT) of the passive optical network (XG-PON1) according to the exemplary embodiment of the present disclosure.

Referring to FIG. 4, the method of controlling an upstream band of the passive optical network (XG-PON1) according to the exemplary embodiment of the present disclosure includes: monitoring upstream frame data received for each T-CONT (S40), determining whether a queue report error is generated for each T-CONT according to a result of the monitoring (S41), recognizing a corresponding ONU when the queue report error is generated (S42 and S43), and allocating an upstream band for the ONU, in which the queue report error is generated, separately from a normal ONU (S44).

The control method of FIG. 4 will be described based on the OLT apparatus according to the exemplary embodiment of FIGS. 2 and 3.

In step S40, the frame monitoring unit 30 first receives a copy of upstream XGEM frame data and AllocID information, which is identification information of the T-CONT, among outputs transmitted from the XGTC frame receiver 34 and the XGEM frame receiver 35, and determines whether a frame is an idle frame by using header information of the input XGEM frame data. Next, the frame monitoring unit 30 adds each of the entire size (the number of bytes) of the upstream frame data for each AllocID and a size of the idle frame (the number of bytes) by counting a length of each frame to transmit the addition to the error detection unit 31.

Next, in step S41, the error detection unit 31 calculates a ratio of the size of the idle frame to the entire size of the received upstream data frame for each AllocID, and determines that the queue report error is generated when the calculated ratio is larger than a predetermined threshold (S42). When the queue report error is generated as described above, the error detection unit 31 may transmit error generation information to the processor 331 of the band allocation controller 33 in an alarm form.

Next, in step S43, the processor 331 recognizes the ONU, in which the queue report error is generated, through the AllocID of the T-CONTs in which the alarm is generated.

Subsequently, in step S44, the processor 331 controls so that the abnormal ONU band allocation unit 333, not the existing normal ONU band allocation unit 332, processes the band allocation for the ONU, in which the queue report error is generated, and the multiplexer 334 multiplexes the band allocation information generated in the normal ONU band allocation unit 332 and the abnormal ONU band allocation unit 333 and transmits the multiplexed band allocation information to the XGTC frame transmitter 37, so that the band allocation for the ONU, in which the queue report error is generated, is separately performed from the band allocation for the normal ONU. A method according to pre-setting by a user may be selected as an algorithm used in this case, or various methods, including a decrease in band allocation for every predetermined level (for example, ½) according to the number of times of the queue report errors may be used for the algorithm.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An optical line terminal (OLT) of a passive optical network (PON), comprising:
a frame monitoring unit configured to monitor upstream frame data received for each transmission container (T-CONT);
an error detection unit configured to determine whether a queue report error is generated for each T-CONT according to a result of the monitoring; and
a band allocation controller configured to allocate an upstream band for an optical network unit (ONU) that generates the queue report error,
wherein the band allocation controller includes
a normal ONU band allocation unit that processes the band allocation for the normal ONU,
an abnormal ONU band allocation unit, and
a processor configured to control so that the abnormal ONU band allocation unit processes the band allocation for the ONU in which the queue report error is generated, by using information received from the error detection unit.

2. The optical line terminal of claim 1, wherein the frame monitoring unit determines whether a frame is an idle frame by using header information of the received upstream frame data, and calculates an entire size of the upstream frame data for each T-CONT and a size of the idle frame.

3. The optical line terminal of claim 2, wherein the frame monitoring unit receives upstream XGEM frame data and identification information (AllocID) of the T-CONT among outputs transmitted from an XGTC frame receiver to an XGEM frame receiver within an OLT media access control (MAC).

4. The optical line terminal of claim 2, wherein when the size of the idle frame to the entire size of the upstream frame data according to a result of the calculation is larger than a predetermined threshold, the error detection unit determines that the queue report error is generated.

5. The optical line terminal of claim 1, wherein the band allocation controller further includes:
a multiplexer configured to multiplex band allocation information generated in the normal ONU band allocation unit and the abnormal ONU band allocation unit.

6. The optical line terminal of claim 1, wherein the processor recognizes the ONU, in which the queue report error is generated, by using the identification information (AllocID) of the T-CONT.

7. A method of controlling an upstream band by using an optical line terminal (OLT) of a passive optical network (PON), the method comprising:
monitoring upstream frame data received for each transmission container (T-CONT);

determining whether a queue report error is generated for each T-CONT according to a result of the monitoring; and allocating an upstream band for an optical network unit (ONU) that generates the queue report error, wherein the allocating of the upstream band includes recognizing an ONU, in which the queue report error is generated, by using the identification information (AllocID) of the T-CONT, and controlling so that a normal ONU band allocation unit processes the band allocation for the normal ONU and an abnormal ONU band allocation unit separately processes band allocation for the ONU in which the queue report error is generated.

8. The method of claim 7, wherein the monitoring of the upstream frame data includes:

determining whether a frame is an idle frame by using header information of the received upstream frame data; and calculating an entire size of the upstream frame data and a size of the idle frame for each T-CONT.

9. The method of claim 7, wherein the determining whether the queue report error is generated includes determining that the queue report error is generated when the size of the idle frame to the entire size of the upstream frame data according to a result of the calculation is larger than a predetermined threshold.

* * * * *